United States Patent
Ito et al.

(10) Patent No.: US 12,088,930 B2
(45) Date of Patent: Sep. 10, 2024

(54) INFORMATION PROCESSING SYSTEM, INFORMATION PROCESSING METHOD, AND MEMORY MEDIUM

(71) Applicant: Safie Inc., Tokyo (JP)

(72) Inventors: Shogo Ito, Tokyo (JP); Wataru Oniki, Tokyo (JP); Daichi Takagi, Tokyo (JP); Yusuke Shimada, Tokyo (JP); Naoaki Kashiwagi, Tokyo (JP); Naoki Tomita, Tokyo (JP)

(73) Assignee: Safie Inc., Tokyo (JP)

( * ) Notice: Subject to any disclaimer, the term of this patent is extended or adjusted under 35 U.S.C. 154(b) by 0 days.

(21) Appl. No.: 18/244,018

(22) Filed: Sep. 8, 2023

(65) Prior Publication Data

US 2024/0187743 A1    Jun. 6, 2024

(30) Foreign Application Priority Data

Dec. 1, 2022 (JP) ................... 2022-193108

(51) Int. Cl.
*H04N 23/81* (2023.01)
*H04N 17/00* (2006.01)

(52) U.S. Cl.
CPC .......... *H04N 23/81* (2023.01); *H04N 17/002* (2013.01)

(58) Field of Classification Search
CPC .... H04N 13/25; H04N 5/2352; H04N 5/2258; H04N 13/111; H04N 17/002; H04N 23/81

USPC ........................................... 348/187
See application file for complete search history.

(56) References Cited

U.S. PATENT DOCUMENTS

| | | | | |
|---|---|---|---|---|
| 11,163,097 B1* | 11/2021 | Brailovskiy | ............. | H04N 5/33 |
| 2008/0158362 A1* | 7/2008 | Butterworth | ......... | H04N 17/002 |
| | | | | 348/E17.002 |
| 2016/0119617 A1 | 4/2016 | Sagar | | |

FOREIGN PATENT DOCUMENTS

| | | |
|---|---|---|
| JP | 2017-225073 A | 12/2017 |
| JP | 2020-025168 A | 2/2020 |
| WO | 2020/121391 A1 | 6/2020 |

OTHER PUBLICATIONS

Japanese Office Action for 2022-193108 dated Dec. 13, 2022.
Decision to Grant a Patent for 2022-193108 dated Jan. 25, 2023.

* cited by examiner

*Primary Examiner* — Xi Wang
(74) *Attorney, Agent, or Firm* — Sughrue Mion, PLLC

(57) ABSTRACT

An aspect of the present disclosure provides an information processing system configured to process a captured image captured by an image-capturing apparatus including an infrared cut filter. In this information processing system, based on the captured image, a defect relating to the infrared cut filter is detected. Information on the defect is output.

7 Claims, 6 Drawing Sheets

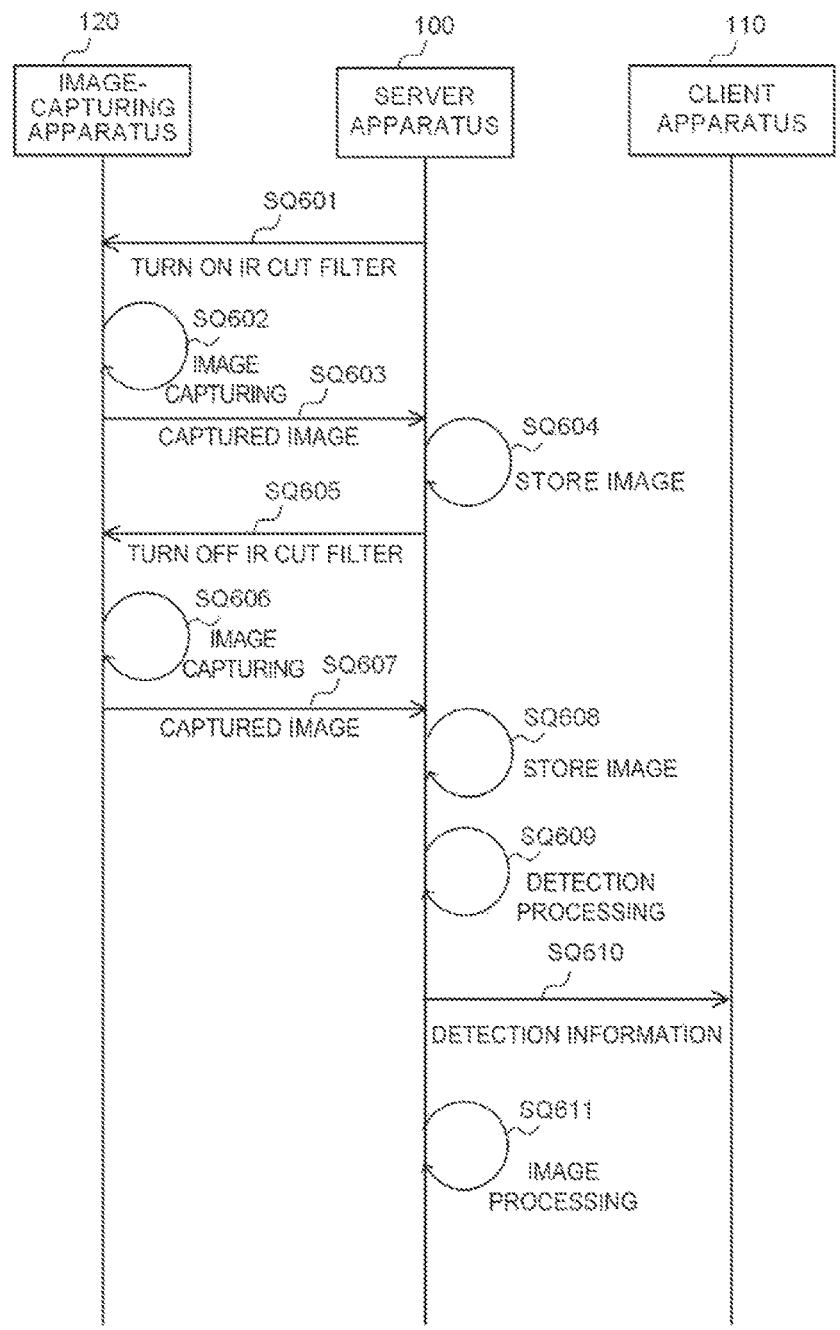

INFORMATION PROCESSING SYSTEM, INFORMATION PROCESSING METHOD, AND MEMORY MEDIUM

CROSS REFERENCE TO RELATED APPLICATIONS

The present application claims priority under 35 U.S.C. § 119 to Japanese Patent Application No. 2022-193108, filed on Dec. 1, 2022.

The present disclosure relates to an information processing system, an information processing method, and a memory medium.

BACKGROUND

A network camera includes two or more physical components (hardware). An example of the physical component is an IR cut filter (infrared cut filter).

Japanese Patent Application, Laid-Open No. 2020-25168 discloses a control system that controls insertion and ejection of an infrared cut filter.

In a case where a defect occurs in one of hardware components of the network camera, when a captured image of a certain quality is captured and stored, it is difficult to quickly determine whether or not a defect occurs in the hardware and whether or not the image is within an acceptable quality range.

An aspect of the present disclosure provides an information processing system configured to process a captured image captured by an image-capturing apparatus including an infrared cut filter. In this information processing system, based on the captured image, a defect relating to the infrared cut filter is detected. Information on the defect is output.

BRIEF DESCRIPTION OF DRAWINGS

FIG. 6 is a sequence diagram illustrating an example of information processing in the information processing system 1000 according to the first modification example.

DETAILED DESCRIPTION

Hereinafter, a description will be given of an embodiment of the present disclosure with reference to drawings. Various features illustrated in the following embodiment can be combined with each other.

A term "unit" in this specification may include, for example, a combination of a hardware resource implemented as circuits in a broad sense and information processing of software that can be concretely realized by the hardware resource. Furthermore, various types of information are described in the present embodiment, and regardless of whether such information is represented by high and low signal values as a set of binary bits consisting of 0 or 1, by physical values of signal values, or by quantum superposition, communication and computation may be executed on a circuit in a broad sense.

The circuit in a broad sense is a circuit realized by properly combining at least a circuit, circuitry, a processor, a memory, and the like. In other words, a circuit includes an application specific integrated circuit (ASIC), a programmable logic device (e.g., simple programmable logic device (SPLD)), a complex programmable logic device (CLPD), field programmable gate array (FPGA), and the like.

A program for realizing a software described in the present embodiment may be implemented in a form downloadable via a server, may be activated on a cloud computer, or may be distributed while being stored in a non-volatile or volatile non-transitory memory medium.

In the following description, daytime means not only a time when the sun has risen in an outdoor situation, but also a time when a room is bright in an indoor situation (e.g., during company business hours) and the like. Nighttime means not only a time when the sun has set in an outdoor situation, but also a time when a room is dark in an indoor situation (e.g., after company business hours) and the like.

1. System Configuration

Figure 1:
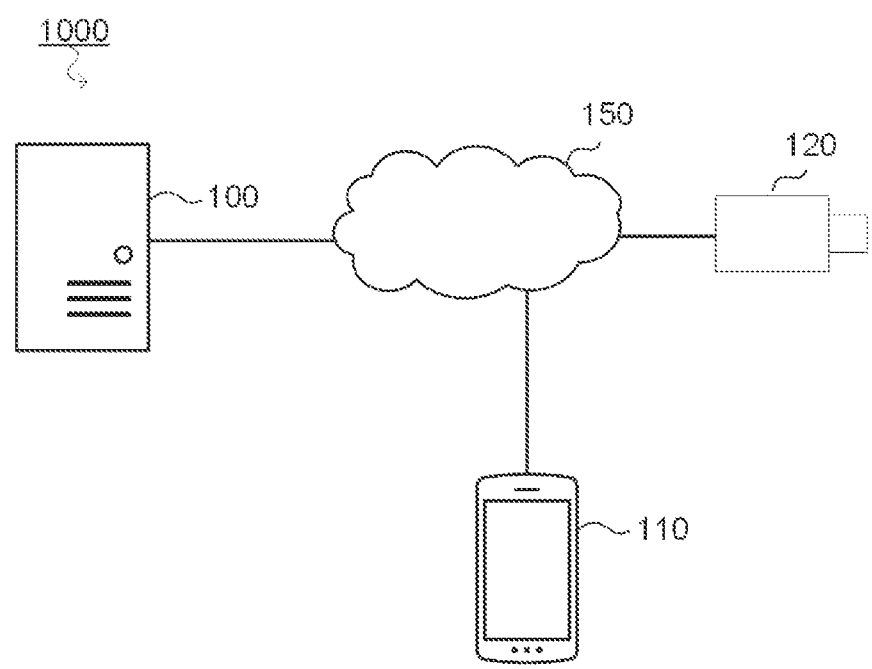
FIG. 1 is a diagram illustrating an example of a system configuration of an information processing system 1000.

FIG. 1 illustrates an example of a system configuration of an information processing system 1000. As illustrated in FIG. 1, the information processing system 1000 includes, as system configurations, a server apparatus 100, a client apparatus 110, and an image-capturing apparatus 120. The server apparatus 100, the client apparatus 110, and the image-capturing apparatus 120 are communicably connected via a network 150. The server apparatus 100 may be realized as cloud.

The server apparatus 100 determines whether or not a defect occurs in at least one hardware component in the image-capturing apparatus 120 by storing a captured image captured by the image-capturing apparatus 120 and analyzing the captured image, and outputs information on the defect of hardware when it is determined that the defect occurs. The image-capturing apparatus 120 is a camera communicable with the server apparatus via the network 150 and transmits a captured image to the server apparatus 100. An example of the image-capturing apparatus 120 is a surveillance camera or the like. The client apparatus 110 is a terminal operated by an administrator or the like of the information processing system 1000 (this user is mainly assumed to be a side providing distribution, maintenance, or the like of the system, but the user may be a client side of the system). For example, information on a defect of hardware may be displayed on a display or the like of the client apparatus 110. Although only one image-capturing apparatus 120 is illustrated in FIG. 1 for simplification, the information processing system 1000 includes two or more image-capturing apparatus 120. However, for simplification, one image-capturing apparatus 120 will be described as an example hereinafter.

Although FIG. 1 illustrates a smartphone as an example of the client apparatus 110, the client apparatus is not limited to a smartphone, but may be a PC (personal computer), tablet computer, or the like. The client apparatus 110 may be any apparatus capable of, for example, displaying information from the server apparatus 100.

Here, the information processing system described in claims may include two or more apparatuses or may consist of a single apparatus. When the information processing system according to claims consists of one apparatus, an example of the apparatus is the server apparatus 100. When the information processing system according to claims includes two or more apparatuses, an example of the two or more apparatuses is the server apparatus 100 and the client apparatus 110, or the server apparatus 100 and the image-capturing apparatus 120.

2. Hardware Configuration

Hardware Configuration of Server Apparatus 100

Figure 2:
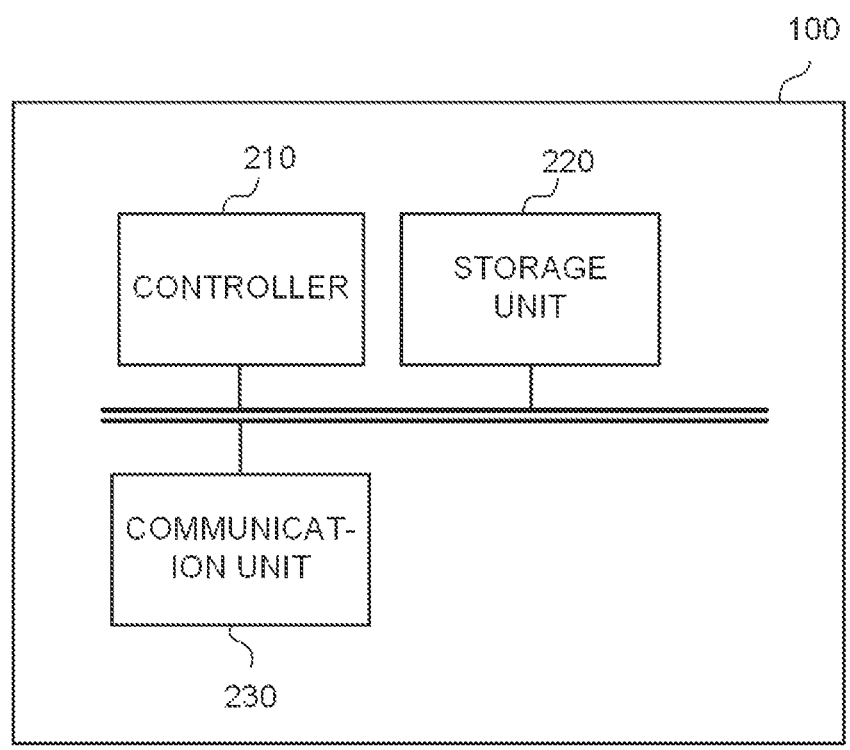
FIG. 2 is a diagram illustrating an example of a hardware configuration of a server apparatus 100.

FIG. 2 illustrates an example of the hardware configuration of the server apparatus 100. The server apparatus 100 includes, as hardware configurations, a controller 210, a storage unit 220, and a communication unit 230.

The controller 210 is a central processing unit (CPU) or the like and controls the entire server apparatus 100. The controller 210 executes processing based on a program stored in the storage unit 220. A function or the like of the server apparatus 100 is realized by the controller 210 executing processing based on the program stored in the storage unit 220.

The storage unit 220 is any of or an arbitrary combination of a hard disk drive (HDD), a read only memory (ROM), a random access memory (RAM), a solid state drive (SSD), and stores a program and data or the like used by the controller 210 to execute processing based on the program. A function of the server apparatus 100 is realized by the controller 210 executing processing based on the program stored in the storage unit 220. The storage unit 220 is an example of a memory medium. In the present embodiment, a description is given of a case where the storage unit 220 stores the data used by the controller 210 to execute processing based on the program, but the data may be stored in a storage unit or the like of another apparatus communicable with the server apparatus 100. In other words, the data may be stored in a storage unit of any apparatus as long as the controller 210 can refer to the data.

The communication unit 230 is a network interface card (NIC) or the like and connects the server apparatus 100 to the network 150 and performs communication with the other apparatus.

Hardware Configuration of Client Apparatus 110

Figure 3:
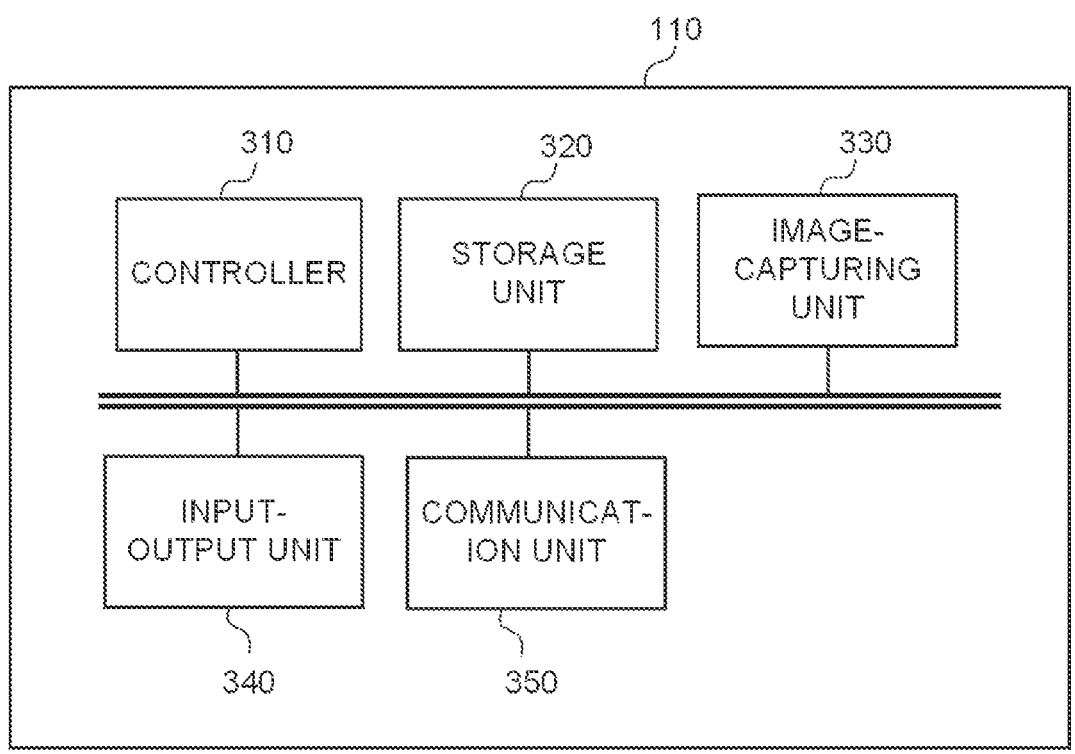
FIG. 3 is a diagram illustrating an example of a hardware configuration of a client apparatus 110.

FIG. 3 illustrates an example of a hardware configuration of the client apparatus 110. The client apparatus 110 includes, as hardware configurations, a controller 310, a storage unit 320, an image-capturing unit 330, an input/output unit 340, and a communication unit 350.

The controller 310 is a CPU or the like and controls the entire client apparatus 110.

The storage unit 320 is any of or an arbitrary combination of an HDD, a ROM, a RAM, an SSD and stores a program and data or the like used by the controller 310 to execute processing based on the program. A function of the client apparatus 110 is realized by the controller 310 executing processing based on the program stored in the storage unit 320.

The image-capturing unit 330 captures an image of an object or the like.

The input/output unit 340 is a touch panel or the like, inputs information based on a user operation, and outputs a result of processing by the controller 310 or the like.

The communication unit 350 connects the client apparatus 110 to the network 150 and performs communication with the other apparatus.

The hardware configuration of the image-capturing apparatus 120 is generally similar to the hardware configuration of the client apparatus 110, and a function of the image-capturing apparatus 120 is realized by a controller of the image-capturing apparatus 120 executing processing based on a program stored in the storage unit of the image-capturing apparatus 120. The image-capturing apparatus 120 includes an image-capturing unit including a lens, an image sensor, and the like. The image-capturing apparatus 120 further includes an infrared emission mechanism so as to perform nighttime image capturing using infrared light and turns the infrared emission mechanism on only during nighttime image capturing. The image-capturing unit of the image-capturing apparatus 120 can also capture infrared light and includes an infrared cut filter (IR cut filter) turned on during the daytime and turned off during the nighttime so as to hinder a whole image captured during the daytime from being reddish (the image may appear peachy or purplish rather than reddish). The image-capturing apparatus 120 further includes a day/night sensor for detecting light to determine whether it is the daytime or the nighttime, and controls turn on or off of the infrared emission mechanism and the IR cut filter (IR cut filter) depending on a result of the determination.

3. Information Processing

A description is given of information processing according to the present embodiment.

Summary of Processing

The controller 210 outputs information on a defect relating to predetermined hardware included in the image-capturing apparatus 120 when the defect relating to the predetermined hardware is detected based on a captured image captured by the image-capturing apparatus 120. In the present embodiment, a description will be given of an example using an infrared cut filter as an example of the predetermined hardware. The infrared cut filter (IR cut filter) is an optical glass attached to the lens of the image-capturing apparatus 120 and cuts infrared light by being turning on (closed) during the daytime image capturing. When a defect occurs in the infrared cut filter and, for example, the infrared cut filter cannot be turned on (closed) and is always turned off (opened), infrared light is not cut, and a whole image captured during the daytime becomes reddish (or may appear peachy or purplish rather than reddish). Alternatively, when, for example, the infrared cut filter is halfway turned on (closed) and stopped, an image captured during the daytime becomes partially reddish. On the other hand, when a defect occurs in the infrared cut filter and, for example, the infrared cut filter cannot be turned off (opened) and is always turned on (closed), infrared light is cut, and a whole image captured during the nighttime becomes dark. Alternatively, when, for example, the infrared cut filter is halfway turned off (opened) and stopped, an image captured during the nighttime becomes partially dark. The cause making images captured during the nighttime become dark includes not only a defect in the infrared cut filter but also a defect in the infrared emission mechanism hindering proper emission of infrared light. Since the controller 210 performs the processing described above, it is possible to quickly output information including that a defect occurs or the like when a defect occurs in hardware of the image-capturing apparatus 120. As a result, it is possible to inform a customer having installed the image-capturing apparatus 120 or the like that a defect occurs, or to request a person in charge of repair to repair the image-capturing apparatus 120.

Details of Processing

A description will be given of an example where the server apparatus side performs detection processing and image processing according to the present embodiment (including modification examples), but the image-capturing apparatus side may perform the processing.

In defect detection processing according to the present embodiment (including modification examples), when a defect is detected once, various processes (transmission of detection information and image processing) are performed afterwards, but the various processes may be performed when a defect is detected two or more times. The number of times of the detection may be set arbitrarily by the user via the client apparatus 110 or the like.

In a case where the defect detection processing according to the present embodiment (including modification examples) is performed both during the daytime and the nighttime, when a defect is detected only during the nighttime, the infrared emission mechanism may be identified as the cause of the defect. When the defect is detected during both the daytime and the nighttime, the infrared cut filter may be identified as the cause of the defect.

A sequence according to the present embodiment (including modification examples) is executed at a predetermined timing such as once a day at a predetermined time. The predetermined timing may be predetermined or may be set arbitrarily by the user via the client apparatus 110 or the like. In any case, for a case where an image captured during the daytime becomes reddish, the predetermined timing may be the daytime, and when the predetermined timing can be set arbitrarily, the user may be encouraged to set the predetermined timing to the daytime by, for example, giving a warning when the user tries to set the predetermined timing to the nighttime. On the other hand, for a case where an image captured during the nighttime becomes dark, the predetermined timing may be the nighttime, and when the predetermined timing can be set arbitrarily, the user may be encouraged to set the predetermined timing to the nighttime by, for example, giving a warning when the user tries to set the predetermined timing to the daytime. In order that such a warning is given, the user may be able to select which of the cases is a target case at a pre-setting stage, and a warning may be given depending on the selected case. In this case, when both of the cases are selected, the warning may not be given.

Figure 4:
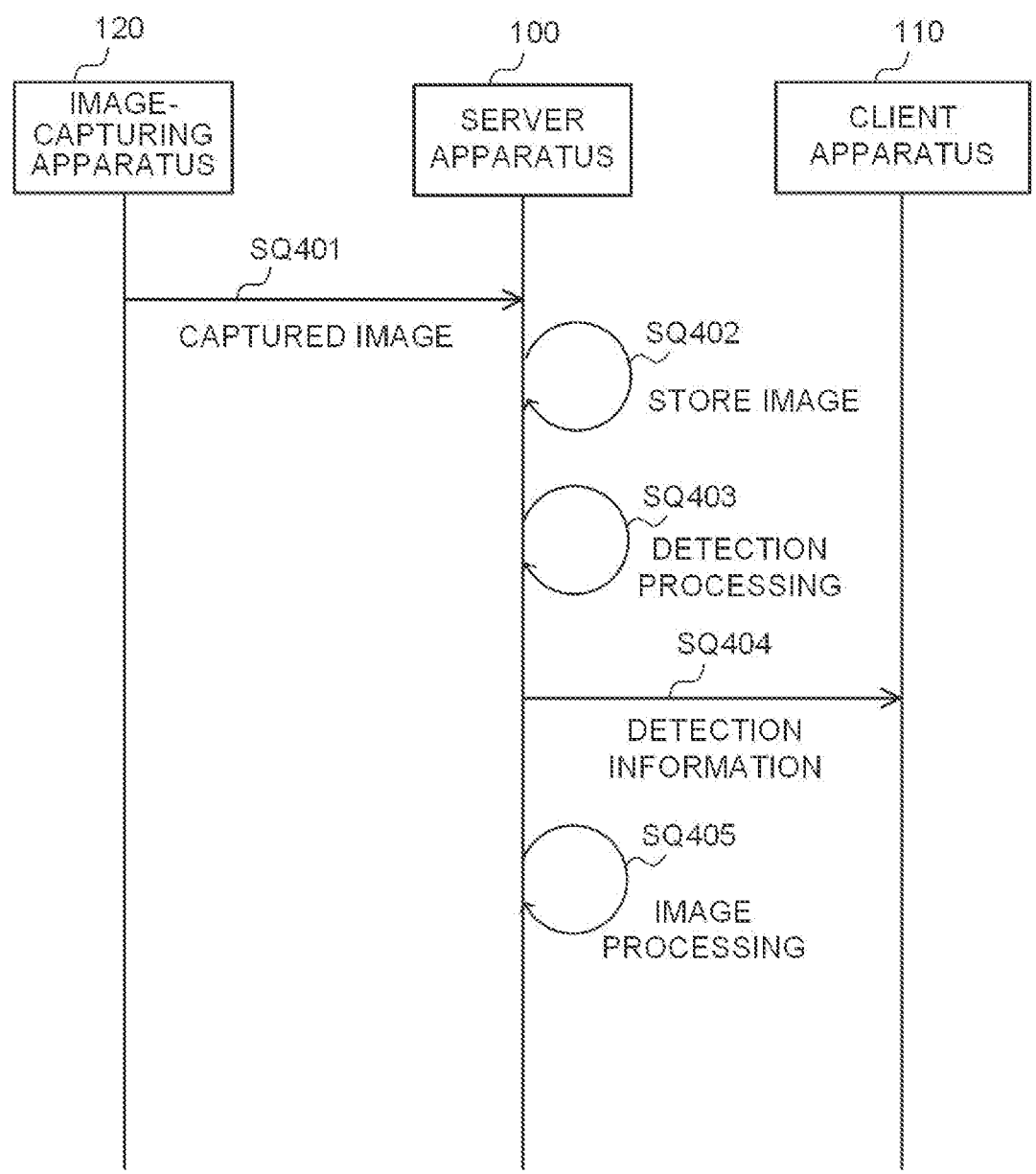
FIG. 4 is a sequence diagram illustrating an example of information processing in the information processing system 1000.

FIG. 4 is a sequence diagram illustrating an example of information processing in the information processing system 1000.

In sequence SQ401, the image-capturing apparatus 120 transmits a captured image to the server apparatus 100. Here, the captured image may include, as attribute information, image-capturing date and time, parameter information relating to the image capturing, identification information for identifying the image-capturing apparatus 120 having captured the captured image, and the like. The controller 210 of the server apparatus 100 receives the captured image transmitted from the image-capturing apparatus 120.

In sequence SQ402, the controller 210 stores the received captured image in the storage unit 220 or the like.

The image-capturing apparatus 120 constantly captures images while it works and transmits the captured images to the server apparatus 100. When the server apparatus 100 receives a captured image, the server apparatus 100 executes the processing in sequence SQ402.

In sequence SQ403, the controller 210 executes the detection processing for checking whether or not a defect occurs in the infrared cut filter based on the captured image stored in the storage unit 220. For example, the controller 210 checks whether or not a defect occurs in the infrared cut filter based on one captured image captured by the image-capturing apparatus 120. More specifically, the controller 210 counts the number of abnormal pixels in the captured image (For example, for a case where an image captured during the daytime becomes reddish, R/G and B/G are calculated for each pixel from RGB color components of the pixel, and a pixel with both of R/G and B/G more than or equal to a threshold is recognized as a reddish pixel, i.e., an abnormal pixel. For example, for a case where an image captured during the nighttime becomes dark, a pixel with all of RGB values less than or equal to a threshold is recognized as a dark pixel, i.e., an abnormal pixel.) and acquires, as a fault degree, a value by dividing a result value of the counting by the total number of pixels in the captured image. This process may not target all pixels and may target pixels every predetermined unit or may generate a reduced image and target all pixels of the reduced image. Furthermore, the controller 210 may perform calculation after conversion from an RGB space to a linear RGB space so as to take into account gamma characteristics of the device. When the fault degree is more than or equal to a threshold, the controller 210 determines that a defect is detected, the defect occurring in the infrared cut filter of the image-capturing apparatus 120. When a defect is detected, a type of defect (a case where an image captured during the daytime becomes reddish/a case where an image captured during the nighttime becomes dark) may be determined based on the time of day and a characteristic in the pixel value. When the fault degree is less than the threshold, the controller 210 determines that a defect does not occur in the infrared cut filter of the image-capturing apparatus 120 and omits processes after sequence SQ404 described below.

As another example, the controller 210 may input a captured image into a learned model. Here, the learned model has performed learning using, as input data, a captured image and, as output data, whether or not a defect occurs in the infrared cut filter of the image-capturing apparatus having captured the captured image. When the output data indicates that a defect occurs in the infrared cut filter, the controller 210 determines that a defect is detected, the defect occurring in the infrared cut filter of the image-capturing apparatus 120. When the output data indicates that a defect does not occur in the infrared cut filter, the controller 210 determines that a defect does not occur in the infrared cut filter of the image-capturing apparatus 120 and omits processes after sequence SQ404 described below.

Figure 5:
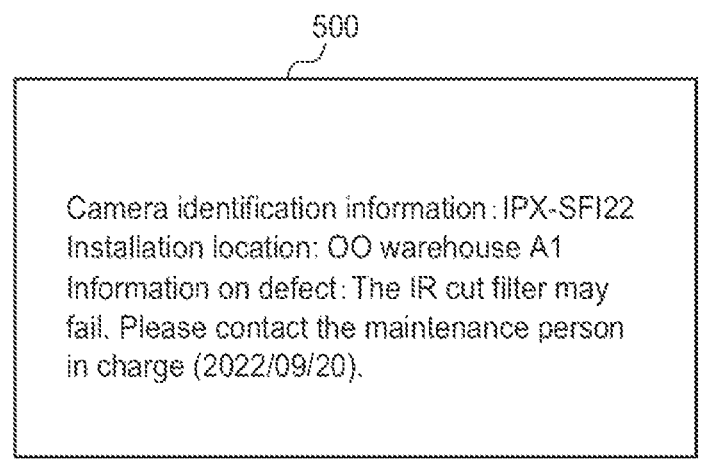
FIG. 5 is a diagram illustrating an example of an electronic mail to be transmitted to the client apparatus 110.

In sequence SQ404, the controller 210 transmits information to the client apparatus 110 to notify the administrator or the like that a defect occurs in the infrared cut filter of the image-capturing apparatus 120. For example, by an electronic mail, the controller 210 transmits, to the administrator, information including that a defect occurs in the infrared cut filter of the image-capturing apparatus 120. FIG. 5 illustrates an example of an electronic mail transmitted to the client apparatus 110. The electronic mail includes information for identifying the image-capturing apparatus 120 with the defect, information on an installation location of the image-capturing apparatus 120, a description of the defect, a detected date of the defect, and the like. The description of the defect may include a type of the defect (a case where an image captured during the daytime becomes reddish/a case where an image captured during the nighttime becomes dark). The date when the defect was detected may include a time, the time of day, information representing daytime/nighttime, or the like. As the hardware where the defect may occur, for example, the infrared emission mechanism may be listed with the IR cut filter, or only one of them may be stated when which of them include the defect is clearly identified.

The part of the e-mail stating "Please contact the maintenance person in charge" is omitted when the notification destination is the maintenance person in charge. The process or the like of sequence SQ404 is an example of a process of outputting information on a defect relating to predetermined hardware when the defect relating to the predetermined hardware is detected based on a pixel value of a captured image. The processes in sequence SQ403 and sequence SQ404 are an example of a process of determining whether or not a defect relating to predetermined hardware occurs based on a pixel value of a captured image and of, when it is determined that the defect relating to the predetermined hardware occurs, determining that the defect relating to the predetermined hardware is detected and outputting information on the defect relating to the predetermined hardware.

Transmitting an electronic mail is an example of output, and any method can be used as long as the user of the client apparatus 110 or the like can be notified that a defect occurs in the infrared cut filter of the image-capturing apparatus 120. For example, the controller 210 may transmit a message including a content such as the content illustrated in FIG. 5 to the person in charge in a business chat tool.

As another example of output, the controller 210 may store information including that a defect has occurred in the infrared cut filter of the image-capturing apparatus 120 in a CSV format, etc. (stores a file where information described in the above-described e-mail is organized by type and summarized) in a predetermined area of the storage unit 220 or the like.

In sequence SQ405, the controller 210 performs image processing suitable for the defect occurring in the infrared cut filter on the captured image stored in the storage unit 220. For example, in a case where an image captured during the daytime becomes reddish, the controller 210 performs image processing for adjusting RGB values so as to reduce the redness of the reddish captured image. In a case where an image captured during the nighttime becomes dark, the controller 210 performs image processing for adjusting RGB values so as to brighten the darkened captured image. This process is an example of a process of executing image processing suitable for a defect on a captured image captured by the image-capturing apparatus 120.

Here, when a defect relating to the infrared cut filter of the image-capturing apparatus 120 is detected, the controller 210 may execute image processing suitable for the defect on a captured image captured by the image-capturing apparatus 120 from when the defect occurring in the infrared cut filter of the image-capturing apparatus 120 is detected to when the client apparatus 110 or the like receives information including that the defect relating to the infrared cut filter of the image-capturing apparatus 120 is resolved.

According to the present embodiment, when a defect occurs in the hardware of the 120 image-capturing apparatus, it is possible to detect the defect based on the captured image and to quickly output information including that the defect occurs or the like. As a result, it is possible to inform the customer or the like having installed the image-capturing apparatus 120 that a defect occurs or to request the person in charge of repair to repair the image-capturing apparatus 120. Even when a lot of image-capturing apparatuses are installed in various locations, it is not necessary to visit the location to manually check for the defect, which reduces installation cost, management cost, or the like of the entire information processing system 1000.

First Modification Example

A description will be given of the first modification example of the above-described embodiment.

FIG. 6 is a sequence diagram illustrating an example of information processing in the information processing system 1000 according to the first modification example.

For example, when it is determined that it becomes the predetermined timing, the controller 210 of the server apparatus 100 according to the first modification example transmits in sequence SQ601, to the image-capturing apparatus 120, a control signal for turning on (making it effective) a function of the infrared cut filter. The image-capturing apparatus 120 according to the first modification example receives, from the server apparatus 100, the control signal for turning on (making it effective) the function of the infrared cut filter.

The image-capturing apparatus 120 receives the control signal for turning on (making effective) the function of the infrared cut filter, and then in sequence SQ602, the image-capturing apparatus 120 turns on (making effective) the function of the infrared cut filter, performs image capturing, and generates a captured image. A mode of performing image capturing with the function of the infrared cut filter turned on (made to effective) is referred to as an IR cut filter ON mode. The IR cut filter ON mode is an example of a first image-capturing mode. In a case where the function of the infrared cut filter has already been effective (in a case where the image-capturing apparatus 120 has already operated in the IR cut filter ON mode), the image-capturing apparatus 120 performs image capturing as it is and generates a captured image. The attribute information of the captured image according to the first modification example includes information including that the function of the infrared cut filter is effective when the function is effective, and includes information including that the function of the infrared cut filter is ineffective when the function is ineffective.

In sequence SQ603, the image-capturing apparatus 120 transmits the captured image to the server apparatus 100. The controller 210 of the server apparatus 100 receives the captured image transmitted from the image-capturing apparatus 120.

In sequence SQ604, the controller 210 stores the received captured image in the storage unit 220 or the like.

For example, after a predetermined time has elapsed since the transmission of the control signal for turning on (making effective) the function of the infrared cut filter, the controller 210 transmits, to the image-capturing apparatus 120, a control signal for turning off (making ineffective) the function of the infrared cut filter. This predetermined time may be set to a time such that image capturing in SQ602 and image capturing in SQ606 can be regarded to be performed at approximately the same time (so that SQ605 through SQ607 is quickly performed after SQ601 through SQ603). The image-capturing apparatus 120 receives, from the server apparatus 100, the control signal for turning off (making ineffective) the function of the infrared cut filter.

The image-capturing apparatus 120 receives the control signal for turning off (making ineffective) the function of the infrared cut filter, and then in sequence SQ606, the image-capturing apparatus 120 turns off (making ineffective) the function of the infrared cut filter, performs image capturing, and generates a captured image. A mode of performing image capturing with the function of the infrared cut filter turned off (made to ineffective) is referred to as an IR cut filter OFF mode. The IR cut filter OFF mode is an example of a second image-capturing mode. In a case where the function of the infrared cut filter has already been ineffective (in a case where the image-capturing apparatus 120 has already operated in the IR cut filter OFF mode), the image-capturing apparatus 120 performs image capturing as it is and generates a captured image.

That is, the image-capturing apparatus 120 can capture an image in the IR cut filter ON mode with the infrared cut filter effective and in the IR cut filter OFF mode with the infrared cut filter ineffective.

In sequence SQ607, the image-capturing apparatus 120 transmits the captured image to the server apparatus 100. The controller 210 of the server apparatus 100 receives the captured image transmitted from the image-capturing apparatus 120.

In sequence SQ608, the controller 210 stores the received captured image in the storage unit 220 or the like.

The order of processes in sequence SQ601 and in sequence SQ602 may be reversed. Alternatively, the order may be determined depending on the state of the IR cut filter at a time when the sequence in FIG. 6 is started (e.g., when the IR cut filter is effective at the beginning, the order may be such that turning on precedes turning off).

In sequence SQ609, the controller 210 executes detection processing of checking whether or not a defect occurs in the infrared cut filter based on the captured image captured in the IR cut filter ON mode and the captured image captured in the IR cut filter OFF mode, the captured images having been stored in the storage unit 220. For example, when there is no difference between the captured image captured in the IR cut filter ON mode and the captured image captured in the IR cut filter OFF mode, that is, when both of images captured during the daytime are wholly or partially reddish or neither is reddish, or when both of images captured during the nighttime are wholly or partially darkened or neither is darkened, it is determined that a defect is detected, the defect occurring in the infrared cut filter.

More specifically, the controller 210 compares the captured image captured in the IR cut filter ON mode (hereinafter also referred to as a first captured image) with the captured image captured in the IR cut filter OFF mode (hereinafter also referred to as a second captured image) and excludes an image area with a difference other than a color difference from comparison target area. For example, when a position of an object (e.g., a car) in the first captured image is different from a position of the object in the second captured image, an area including the object in the first captured image and an area including the object in the second captured image are excluded from the comparison target area by deleting the areas from the first captured image and the second captured image. The controller 210 calculates a color difference between pixels at the same position in the comparison target area of the first captured image and the comparison target area of the second captured image. More specifically, the controller 210 calculates a difference between any or all of RGB color components for each pair of pixels, recognizes, as an abnormal pixel, a pair of pixels with any or all of the differences less than a threshold, and counts the number of abnormal pixels. The threshold may be set to different values depending on the time of image capturing (daytime/nighttime). The fault degree is acquired by dividing the counted value is by the total number of pixels in the captured image. This process may not target all pixels and may target pixels every predetermined unit, or may generate a reduced image and target all pixels of the reduced image. When the fault degree is more than or equal to a threshold, the controller 210 determines that a defect is detected, the defect occurring in the infrared cut filter of the image-capturing apparatus 120. When a defect is detected, a type of defect (a case where an image captured during the daytime becomes reddish/a case where an image captured during the nighttime becomes dark) may be determined based on the time of day and a characteristic in the pixel value. When the controller 210 determines that a defect does not occur, the controller 210 omits processes after sequence SQ610 described below. The method of detecting a defect may be a method of acquiring a difference between histograms of the two captured images as in the second modification example.

As another example, the controller 210 may input the first captured image and the second captured image into a learned model. Here, the learned model has performed learning using, as input data, a first captured image and a second captured image and, as output data, whether or not a defect occurs in the infrared cut filter of the image-capturing apparatus having captured the first captured image and the second captured image. When the output data indicates that a defect occurs in the infrared cut filter, the controller 210 determines that a defect is detected, the defect occurring in the infrared cut filter of the image-capturing apparatus 120. When the output data indicates that a defect does not occur in the infrared cut filter, the controller 210 determines that a defect does not occur in the infrared cut filter of the image-capturing apparatus 120 and omits processes after sequence SQ610 described below.

In sequence SQ610, the controller 210 transmits, to the client apparatus 110, information including that a defect occurs in the infrared cut filter of the image-capturing apparatus 120 so as to notify the administrator or the like of the information. For example, by an electronic mail with a content as illustrated in FIG. 5, the controller 210 transmits, to the administrator, information including that a defect occurs in the infrared cut filter of the image-capturing apparatus 120. The process or the like in sequence SQ610 is an example of a process of outputting information on a defect relating to an infrared cut filter when the defect relating to the infrared cut filter is detected based on a first captured image and a second captured image. The processes in sequence SQ609 and sequence SQ610 are an example of a process of determining whether or not a defect relating to an infrared cut filter occurs based on a first captured image and a second captured image and of, when it is determined that the defect relating to the infrared cut filter occurs, determining that the defect relating to the infrared cut filter is detected and outputting information on the defect relating to the infrared cut filter.

Transmitting an electronic mail is an example of output, and any method can be used as long as the user of the client apparatus 110 or the like can be notified that a defect occurs in the infrared cut filter of the image-capturing apparatus 120. For example, the controller 210 may transmit a message including a content such as the content illustrated in FIG. 5 to the person in charge in a business chat tool.

As another example of output, the controller 210 may store information including that a defect has occurred in the infrared cut filter of the image-capturing apparatus 120 in a CSV format, etc. (stores a file where information described in the above-described e-mail is organized by type and summarized) in a predetermined area of the storage unit 220 or the like.

In sequence SQ611, the controller 210 performs image processing suitable for the defect occurring in the infrared cut filter on the captured image stored in the storage unit 220. For example, in a case where an image captured during the daytime becomes reddish, the controller 210 performs image processing for adjusting RGB values so as to reduce the redness of the reddish captured image. In a case where an image captured during the nighttime becomes dark, the controller 210 performs image processing for adjusting RGB values so as to brighten the darkened captured image.

Here, when a defect relating to the infrared cut filter of the image-capturing apparatus 120 is detected, the controller 210 may execute image processing suitable for the defect on a captured image captured by the image-capturing apparatus 120 from when the defect occurring in the infrared cut filter of the image-capturing apparatus 120 is detected to when the client apparatus 110 or the like receives information including that the defect relating to the infrared cut filter of the image-capturing apparatus 120 is resolved.

According to the first modification example, when a defect occurs in the hardware of the 120 image-capturing apparatus, it is also possible to detect the defect based on the captured image and to quickly output information including that the defect occurs or the like. As a result, it is possible to inform the customer or the like having installed the image-capturing apparatus 120 that a defect occurs or to request the person in charge of repair to repair the image-capturing apparatus 120. Even when a lot of image-capturing apparatuses are installed in various locations, it is not necessary to visit the location to manually check for the defect, which reduces installation cost, management cost, or the like of the entire information processing system 1000.

Second Modification Example

A description will be given of the second modification example.

The attribute information of the captured image in the second modification example includes an operation mode when a captured image was captured. This operation mode includes at least a daytime image-capturing mode (infrared emission OFF/IR cut filter ON) and a nighttime image-capturing mode (infrared emission ON/IR cut filter OFF).

Using image-capturing date and time and the operation mode both included in the attribute information of the captured image stored in the storage unit 220 or the like, the controller 210 according to the second modification example executes detection processing of checking whether or not a defect occurs in the infrared cut filter of the image-capturing apparatus 120, based on at least two captured images captured in the same operating mode and on different image-capturing dates or times (hereinafter also referred to as a third captured image and a fourth captured image). For example, the controller 210 calculates a difference between a histogram of an image relating to an object included in the third captured image and a histogram of an image relating to the same object included in the fourth captured image and determines that a defect occurring in the infrared cut filter is detected when the difference is more than or equal to a threshold. On the other hand, when the difference is less than a threshold, the controller 210 determines that a defect does not occur in the infrared cut filter. The method for detecting the defect may be a method of calculating a color difference between pixels in the two captured images, as in the first modification example.

As another example, the controller 210 may input the third captured image and the fourth captured image into a learned model. Here, the learned model has performed learning using, as input data, a third captured image and a fourth captured image and, as output data, whether or not a defect occurs in the infrared cut filter of the image-capturing apparatus having captured the third captured image and the fourth captured image. When the output data indicates that a defect occurs in the infrared cut filter, the controller 210 determines that a defect is detected, the defect occurring in the infrared cut filter of the image-capturing apparatus 120. When the output data indicates that a defect does not occur in the infrared cut filter, the controller 210 determines that a defect does not occur in the infrared cut filter of the image-capturing apparatus 120.

When the controller 210 detects that a defect occurs in the infrared cut filter of the image-capturing apparatus 120, the controller 210 transmits, to the client apparatus 110, information including that a defect occurs in the infrared cut filter of the image-capturing apparatus 120 so as to notify the administrator or the like. For example, by an electronic mail with a content as illustrated in FIG. 5, the controller 210 transmits, to the administrator, information including that a defect occurs in the infrared cut filter of the image-capturing apparatus 120. This process is an example of a process of outputting information on a defect relating to an infrared cut filter when the defect relating to the infrared cut filter is detected based on at least two captured images captured at different times by the image-capturing apparatus 120. The above-mentioned process of detecting the defect relating to the infrared cut filter and this process are an example of a process of determining whether or not a defect relating to an infrared cut filter occurs based on pixel values of at least two captured images captured at different times by the image-capturing apparatus 120 and of, when it is determined that the defect relating to the infrared cut filter occurs, determining that the defect relating to the infrared cut filter is detected and outputting information on the defect relating to the infrared cut filter.

Transmitting an electronic mail is an example of output, and any method can be used as long as the user of the client apparatus 110 or the like can be notified that a defect occurs in the infrared cut filter of the image-capturing apparatus 120. For example, the controller 210 may transmit a message including a content such as the content illustrated in FIG. 5 to the person in charge in a business chat tool.

As another example of output, the controller 210 may store information including that a defect has occurred in the infrared cut filter of the image-capturing apparatus 120 in a CSV format, etc. (stores a file where information described in the above-described e-mail is organized by type and summarized) in a predetermined area of the storage unit 220 or the like.

According to the second modification example, when a defect occurs in the hardware of the 120 image-capturing apparatus, it is also possible to detect the defect based on the captured image and to quickly output information including that the defect occurs or the like. As a result, it is possible to inform the customer or the like having installed the image-capturing apparatus 120 that a defect occurs or to request the person in charge of repair to repair the image-capturing apparatus 120. Even when a lot of image-capturing apparatuses are installed in various locations, it is not necessary to visit the location to manually check for the defect, which reduces installation cost, management cost, or the like of the entire information processing system 1000.

Moreover, the present disclosure may be provided in each of the following aspects.
  (1) An information processing system configured to process a captured image captured by an image-capturing apparatus including an infrared cut filter, wherein: when, based on a color component of the captured image, the captured image is determined to be reddish, a defect relating to the infrared cut filter is detected, and information on the defect is output.
  (2) The information processing system according to (1), wherein: the image-capturing apparatus is configured to capture an image in (a) a first image-capturing mode with the infrared cut filter effective or in (b) a second image-capturing mode with the infrared cut filter ineffective, and the defect is detected based on a difference between a first captured image and a second captured image captured in a same mode of either the first image-capturing mode or the second image-capturing mode at different times from each other.
(3) The information processing system according to (2), wherein: in detection of the defect, when the difference between the first captured image and the second captured image is more than or equal to a predetermined value, it is determined that the defect occurs in the infrared cut filter.
(4) The information processing system according to (1), wherein: when the defect relating to the infrared cut filter is detected, image processing for reducing an effect of the defect is executed on a captured image captured by the image-capturing apparatus.
(5) The information processing system according to (4), wherein the image processing for reducing the effect of the defect is performed on a captured image captured by the image-capturing apparatus during a period from when the defect is detected to when the defect is resolved.
(6) An information processing system configured to process a captured image captured by an image-capturing apparatus including an infrared cut filter, wherein: based on the captured image, a defect relating to the infrared cut filter is detected, information on the defect is output, the image-capturing apparatus is configured to capture an image in (a) a first image-capturing mode with the infrared cut filter effective or in (b) a second image-capturing mode with the infrared cut filter ineffective, and the defect is detected based on a difference between (a) a first captured image captured in the first image-capturing mode and (b) a second captured image captured in the second image-capturing mode.
(7) The information processing system according to (6), wherein: in detection of the defect, when the difference between the first captured image and the second captured image is less than a predetermined value, it is determined that the defect occurs in the infrared cut filter.
(8) An information processing system configured to process a captured image captured by an image-capturing apparatus including predetermined hardware, wherein: when, based on a color component of the captured image, the captured image is determined to be reddish, a defect relating to the predetermined hardware is detected, and information on the defect is output.
(9) An information processing method executed by an information processing system configured to process a captured image captured by an image-capturing apparatus including an infrared cut filter, wherein: when, based on a color component of the captured image, the captured image is determined to be reddish, a defect relating to the infrared cut filter is detected, and information on the defect is output.
(10) An information processing method executed by an information processing system configured to process a captured image captured by an image-capturing apparatus including an infrared cut filter, wherein: based on the captured image, a defect relating to the infrared cut filter is detected, information on the defect is output, the image-capturing apparatus is configured to capture an image in (a) a first image-capturing mode with the infrared cut filter effective or in (b) a second image-capturing mode with the infrared cut filter ineffective, and the defect is detected based on a difference between (a) a first captured image captured in the first image-capturing mode and (b) a second captured image captured in the second image-capturing mode.
(11) A computer-readable memory medium storing a program for allowing a computer to function as the information processing system according to (1).

The present disclosure is not limited to those.

For example, part or all of the processing in the server apparatus 100 described above may be executed in the image-capturing apparatus 120.

In the above-described embodiment and the like, the infrared cut filter is described as an example of the predetermined hardware of the image-capturing apparatus 120, but the same applies to a case where the predetermined hardware is other hardware such as a lens, an image sensor, or the like of the image-capturing apparatus 120.

Finally, various embodiments of the present disclosure have been described, but these are presented as examples and are not intended to limit the scope of the disclosure. Novel embodiments can be implemented in various other forms, and various omissions, replacements, and modifications can be made within the scope of the spirit of the disclosure. The embodiments and its modifications are included in the scope and the spirit of the disclosure and are included in the scope of the invention described in claims and the equivalent scope thereof.

(1) An information processing system configured to process a captured image captured by an image-capturing apparatus including an infrared cut filter, wherein a defect relating to the infrared cut filter is detected based on the captured image, and information on the defect is output.
(2) The information processing system according to (1), wherein the defect is detected based on a color component of the captured image.
(3) The information processing system according to (2), wherein the color component of the captured image is analyzed, and when it is determined that the captured image is reddish or darkened, the defect relating to the infrared cut filter is detected.
(4) The information processing system according to (1), wherein the image-capturing apparatus is configured to capture an image in (a) a first image-capturing mode with the infrared cut filter effective or in (b) a second image-capturing mode with the infrared cut filter ineffective, and the defect is detected based on a difference between a first captured image captured in the first image-capturing mode and a second captured image captured in the second image-capturing mode.
(5) The information processing system according to (4), wherein in detection of the defect, when the difference between the first captured image and the second captured image is less than a predetermined value, it is determined that the defect occurs in the infrared cut filter.
(6) The information processing system according to (1), wherein the image-capturing apparatus is configured to capture an image in (a) a first image-capturing mode with the infrared cut filter effective or in (b) a second image-capturing mode with the infrared cut filter ineffective, and the defect is detected based on a difference between a first captured image and a second captured image captured in a same mode of either the first image-capturing mode or the second image-capturing mode at different times from each other.

(7) The information processing system according to (6), wherein in detection of the defect, when the difference between the first captured image and the second captured image is more than or equal to a predetermined value, it is determined that the defect occurs in the infrared cut filter.

(8) The information processing system according to (1), wherein when the defect relating to the infrared cut filter is detected, image processing for reducing an effect of the defect is executed on a captured image captured by the image-capturing apparatus.

(9) The information processing system according to (8), wherein the image processing for reducing the effect of the defect is performed on a captured image captured by the image-capturing apparatus during a period from when the defect is detected to when the defect is resolved.

(10) An information processing system configured to process a captured image captured by an image-capturing apparatus including predetermined hardware, wherein a defect relating to the predetermined hardware is detected based on the captured image, and information on the defect is output.

(11) An information processing method executed by an information processing system configured to process a captured image captured by an image-capturing apparatus including an infrared cut filter, wherein a defect relating to the infrared cut filter is detected based on the captured image, and information on the defect is output.

(12) A program for allowing a computer to function as the information processing system according to any one of (1) to (10).

What is claimed is:

1. An information processing system configured to process a captured image captured by an image-capturing apparatus including an infrared cut filter, wherein:
    based on the captured image, a defect relating to the infrared cut filter is detected, information on the defect is output,
    the image-capturing apparatus is configured to capture an image in (a) a first image-capturing mode with the infrared cut filter effective and in (b) a second image-capturing mode with the infrared cut filter ineffective, and
    the defect is detected based on a difference between (a) a first captured image captured in the first image-capturing mode and (b) a second captured image captured in the second image-capturing mode, and
wherein:
    in detection of the defect, when the difference between the first captured image and the second captured image is less than a predetermined value, it is determined that the defect occurs in the infrared cut filter.

2. An information processing method executed by an information processing system configured to process a captured image captured by an image-capturing apparatus including an infrared cut filter, the information processing method comprising:
    detecting, based on the captured image, a defect relating to the infrared cut filter; and
    outputting information on the defect,
    wherein the image-capturing apparatus is configured to capture an image in (a) a first image-capturing mode with the infrared cut filter effective and in (b) a second image-capturing mode with the infrared cut filter ineffective, and
    the defect is detected based on a difference between (a) a first captured image captured in the first image-capturing mode and (b) a second captured image captured in the second image-capturing mode, and
    wherein, in detection of the defect, when the difference between the first captured image and the second captured image is less than a predetermined value, it is determined that the defect occurs in the infrared cut filter.

3. A non-transitory computer readable medium storing thereon a program which, when executed by a computer, causes the computer to function as the information processing system according to claim 1.

4. The information processing system according to claim 1, wherein:
    the defect relating to the infrared cut filter is further detected, when, based on a color component of the captured image, the captured image is determined to be reddish.

5. The information processing system according to claim 1, wherein:
    the defect relating to the infrared cut filter is further detected based on a difference between a third captured image and a fourth captured image captured in a same mode of either the first image-capturing mode or the second image-capturing mode and captured at different times from each other.

6. The information processing system according to claim 1, wherein:
    when the defect relating to the infrared cut filter is detected, image processing for reducing an effect of the defect is executed on a captured image captured by the image-capturing apparatus.

7. The information processing system according to claim 6, wherein:
    the image processing for reducing the effect of the defect is performed on a captured image captured by the image-capturing apparatus during a period from when the defect is detected to when the defect is resolved.

* * * * *